US008788520B2

(12) United States Patent
Bodin et al.

(10) Patent No.: US 8,788,520 B2
(45) Date of Patent: Jul. 22, 2014

(54) GATHERING DEVICE ATTRIBUTES FROM MULTIPLE DEVICES TO EXPLOIT THE COMMON OR COMPLIMENTARY FEATURES ON THOSE DEVICES

(75) Inventors: William Bodin, Austin, TX (US); Indiver Dwivedi, Pune (IN); David Jaramillo, Lake Worth, FL (US)

(73) Assignee: International Business Machines Corporation, Armonk, NY (US)

( * ) Notice: Subject to any disclaimer, the term of this patent is extended or adjusted under 35 U.S.C. 154(b) by 346 days.

(21) Appl. No.: 13/221,470

(22) Filed: Aug. 30, 2011

(65) Prior Publication Data

US 2013/0054575 A1 Feb. 28, 2013

(51) Int. Cl.
*G06F 7/00* (2006.01)
*G06F 17/30* (2006.01)

(52) U.S. Cl.
USPC ......................................... 707/769

(58) Field of Classification Search
None
See application file for complete search history.

(56) References Cited

U.S. PATENT DOCUMENTS

| 7,013,149 | B2 | 3/2006 | Vetro et al. |
| 8,001,008 | B2 * | 8/2011 | Engle .......................... 705/26.62 |
| 2002/0065721 | A1 * | 5/2002 | Lema et al. ...................... 705/14 |
| 2006/0277271 | A1 * | 12/2006 | Morse et al. ................... 709/217 |
| 2008/0208950 | A1 | 8/2008 | Kim et al. |
| 2008/0214157 | A1 | 9/2008 | Ramer et al. |
| 2008/0215623 | A1 * | 9/2008 | Ramer et al. ............... 707/104.1 |
| 2008/0248809 | A1 | 10/2008 | Gower |
| 2008/0270561 | A1 * | 10/2008 | Tang et al. .................... 709/207 |
| 2008/0301732 | A1 * | 12/2008 | Archer et al. ................... 725/40 |
| 2010/0164715 | A1 | 7/2010 | Buller et al. |
| 2010/0330969 | A1 | 12/2010 | Kim et al. |
| 2011/0069940 | A1 * | 3/2011 | Shimy et al. ................... 386/296 |
| 2011/0131224 | A1 * | 6/2011 | Bodin et al. ................... 707/758 |
| 2011/0179139 | A1 * | 7/2011 | Starkenburg et al. .......... 709/217 |
| 2012/0078725 | A1 * | 3/2012 | Maitra et al. ............... 705/14.66 |

OTHER PUBLICATIONS

Zhang et. al. "Personalized Content to Delivery to Mobile Devices". 2003, IEEE. 2533-2538. [Annotated with paragraph numbers].*
Surve, M. K., et al., "Method for Targeting Ads on Mobile Devices Based on Device Profile," Sep. 2010, pp. 1-2, IP.com No. IPCOM000200047D.
Fasbender, A., et al. "Any Network, Any Terminal, Anywhere," IEEE Personal Communications, Apr. 1999, 6(2), pp. 22-30.
Zhang, D., et al., Personalized Content to Delivery to Mobile Devices, 2003, IEEE, 2533-2538.

* cited by examiner

*Primary Examiner* — Robert Beausoliel, Jr.
*Assistant Examiner* — Michael Pham
(74) *Attorney, Agent, or Firm* — Cahn & Samuels, LLP (57) ABSTRACT

An embodiment of the invention provides a system including an interface for receiving a device identifier, a user identifier, and a request for a resource from a mobile device. A database connected to the interface includes attributes of mobile devices and user profiles. The user profiles include user identifiers and lists, wherein each of the lists include at least one mobile device used by each user to access resources. The database is queried with the device identifier to identify attributes of the mobile device. A profile of a user is generated or updated based on the user identifier and the identified attributes of the mobile device. A processor connected to the database sends a recommendation to the mobile device based on the profile of the user, the attributes of the mobile device, and the resource requested. The recommendation includes a recommended mobile device or a recommended combination of mobile devices.

25 Claims, 5 Drawing Sheets

GATHERING DEVICE ATTRIBUTES FROM MULTIPLE DEVICES TO EXPLOIT THE COMMON OR COMPLIMENTARY FEATURES ON THOSE DEVICES

BACKGROUND

The present invention is in the field of systems, methods, and computer program products for gathering device attributes from multiple devices to exploit the common or complimentary features on those devices.

As more mobile devices with different features and capabilities emerge in the marketplace, many individuals are using more than one device to connect to the internet and run IT applications. While some individuals will use any of their personal devices to browse the web, some individuals prefer to use specific devices to run certain applications. For example, some individuals prefer to send e-mails with devices having a full QWERTY keyboard. In another example, some individuals prefer to listen to audio files on devices that have open wireless technology (e.g., Bluetooth® enabled).

SUMMARY OF THE INVENTION

An embodiment of the invention provides a system and method for gathering device attributes from multiple devices to exploit the common or complimentary features on those devices. More specifically, an interface receives a device identifier, a user identifier, and a request for a resource from a mobile device. A database connected to the interface includes attributes of mobile devices and user profiles. The user profiles include user identifiers and lists, wherein each of the lists include at least one mobile device used by each user to access resources. The database is queried with the device identifier to identify attributes of the mobile device. A profile of a user is generated or updated based on the user identifier and the identified attributes of the mobile device. A processor connected to the database sends a recommendation to the mobile device based on the profile of the user, the attributes of the mobile device, and the resource requested. The recommendation includes a recommended mobile device or a recommended combination of mobile devices. A link to the resource is automatically sent to an e-mail address of the user and/or a second mobile device of the user.

BRIEF DESCRIPTION OF THE SEVERAL VIEWS OF THE DRAWINGS

The present invention is described with reference to the accompanying drawings. In the drawings, like reference numbers indicate identical or functionally similar elements.

DETAILED DESCRIPTION

Exemplary, non-limiting, embodiments of the present invention are discussed in detail below. While specific configurations are discussed to provide a clear understanding, it should be understood that the disclosed configurations are provided for illustration purposes only. A person of ordinary skill in the art will recognize that other configurations may be used without departing from the spirit and scope of the invention.

An embodiment of the invention provides an automated process of recording and maintaining a list of hand-held devices that a registered user employs for connecting to web applications. This information can be used to share or compliment features across numerous devices on the list to provide one combined function. In other words, features from one device can be leveraged or combined with features from another device to enhance overall capabilities and functionality. Web applications can make run-time decisions of applying customized look-and-feel, behavior, or even suggest use of an alternate device for full-feature use. Furthermore, a catalog of lists from numerous registered users can help web applications in analyzing patterns of mobile device usage by their patrons. IT enterprises could use such a catalog to list approved devices per user that are allowed to access a virtual private network (VPN) or specific applications.

At least one embodiment of the invention provides a system that extracts a user-agent identifier or user-agent identifier string (also referred to herein as a "device identifier") from an incoming http-request. In at least one embodiment, the user-agent identifier or user-agent identifier string (e.g., a cookie) uniquely identifies the make, type, and/or capabilities of an end-user mobile device that people use to interact with IT applications or IT solutions. In at least one embodiment, the user identifier includes a string of letters and/or numbers that uniquely identifies a registered user, e.g., XYZ985352. In at least one embodiment, the user identifier includes the user's name, e-mail address, telephone number, and/or other sequence of numbers and/or letters that uniquely identify the user. The system maintains and updates a map of registered user identifiers to a list of user-agent identifiers and/or user-agent identifier strings.

In at least one embodiment, the system does not sit in between a client and server, and does not intervene or interfere with the usage of a server application by its mobile client. Rather, the system is placed in the background as a web-service which only interacts with the server side web application. The system can help web application service providers by analyzing patterns of mobile device usage by their patrons. Furthermore, the system can help identify mobile devices that can work together to provide greater accessibility or functionality.

Figure 1:
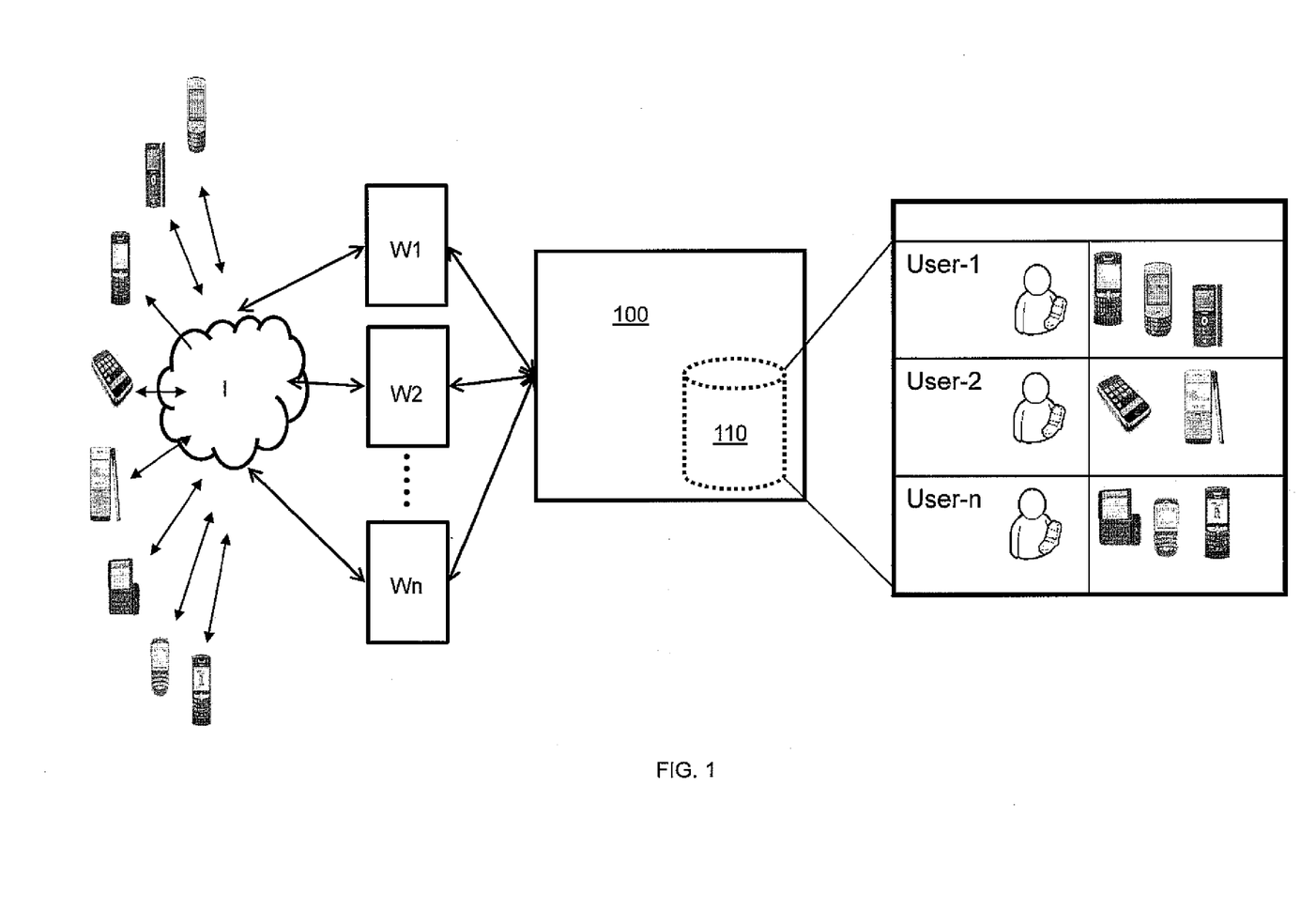
FIG. 1 illustrates a system for gathering device attributes from multiple devices according to an embodiment of the invention.

FIG. 1 illustrates a system 100 for gathering device attributes from multiple devices according to an embodiment of the invention. Mobile devices send http requests (also referred to herein as "requests for resources") to websites W1, W2, and Wn through the internet I. The system 100 provides a user to user-to-device mapping system as a web service. More specifically, the system 100 extracts user-agent identifiers and unique user identifiers from the http requests. In another embodiment, the websites W1, W2, and Wn extract the user-agent identifiers and/or user identifiers and send them to the system 100.

The system 100 includes a persistent data store 110 (also referred to herein as a "database") that includes a list of devices used by each registered user to access the internet I. The data store 110 is queried with a user identifier to identify the devices used by the user associated with the user identifier. For example, as illustrated in FIG. 1, a query of the data store 110 shows the devices used by User-1, User-2, and User-n. Based on information in the data store 110, the system 100 can recommended a device to be used with specific application(s). In addition, the system 100 can recommend a combination of devices that work together to run specific application(s).

In at least one embodiment of the invention, the data store 110 also includes a catalog of devices and a list of attributes (e.g., manufacturer, model, type, capabilities) of each device. For example, an entry for device D1 in the data store 110 includes: manufacturer=Company ABC, model=X-2011, type=tablet computer. The entry also includes capabilities of device D1, such as, for example, memory capacity, connectivity speed, connectivity type (e.g., 4G, Wi-Fi), GPS enabled, camera, video, screen resolution, screen size, touch screen, media player, Bluetooth® enabled operating system, software/application compatibility, image file formats supported, types of audio/video file formats supported, SMS/MMS support, support for near field communication, level/version of CSS, javascript, html supported, etc.

In at least one embodiment, the data store 110 is queried with a user-agent identifier in order to identify the requesting device. Therefore, the system 100 can determine the mobile device types (e.g., BlackBerry, iPad) used to access applications and pass this information along to the websites W1, W2, and Wn, service providers, and/or application developers. In at least one embodiment of the invention, the websites W1, W2, Wn can make multiple run-time decisions to apply specific templates, themes, and/or color-schemes based on the identified device. In another embodiment, the websites W1, W2, Wn and/or the system 100 provides the user with a recommendation to switch to another device for a more full-featured or more usable/customizable application experience.

When a particular resource (e.g., SVG image, PDF document, mp3 audio file, avi video file) is requested by a user on his or her mobile phone, the mobile phone may not be capable of rendering/consuming/playing the resource. In at least one embodiment of the invention, the system automatically identifies one or more secondary devices from the user's profile, and recommends its use to the user.

In another embodiment, the system automatically sends the user a dynamically generated short/mini URL for accessing the resource. The URL is sent to the user's e-mail and/or to another device of the user for immediate access to the resource. In at least one embodiment, before sending the URL or making a recommendation, the system customizes the requested resource. For example, the system transcodes the resource from a first format (e.g., mp3) to a second format (e.g., .wav). This can be performed when the system identifies that a secondary or recommended device is not capable of rendering/consuming/playing the requested resource in the first format, but it can consume it in the second format. Thus, the auto-generated short/mini URL points to the customized resource. Other examples of transcoding from a first format to a second format include image file formats (e.g., png to jpg, jpg to bmp, jpg to gif, etc.), audio file formats (e.g., way to mp3, mp3 to amr, amr to midi, etc.), video file formats (e.g., wmv to mp4, mp4 to mov, mov to 3gpp, flv to swf, avi to mpeg, etc.), document file formats (e.g., ppt to pdf, doc to txt), etc.

Figure 2:
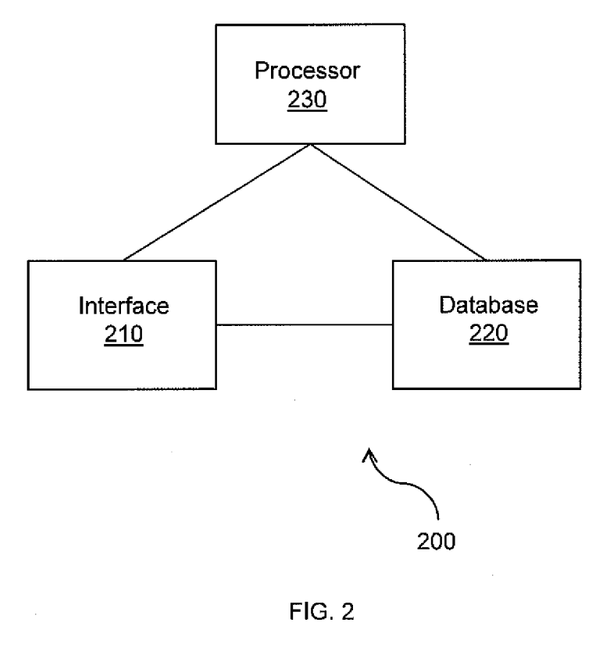
FIG. 2 illustrates a system for gathering device attributes from multiple devices according to another embodiment of the invention.
Figure 3:
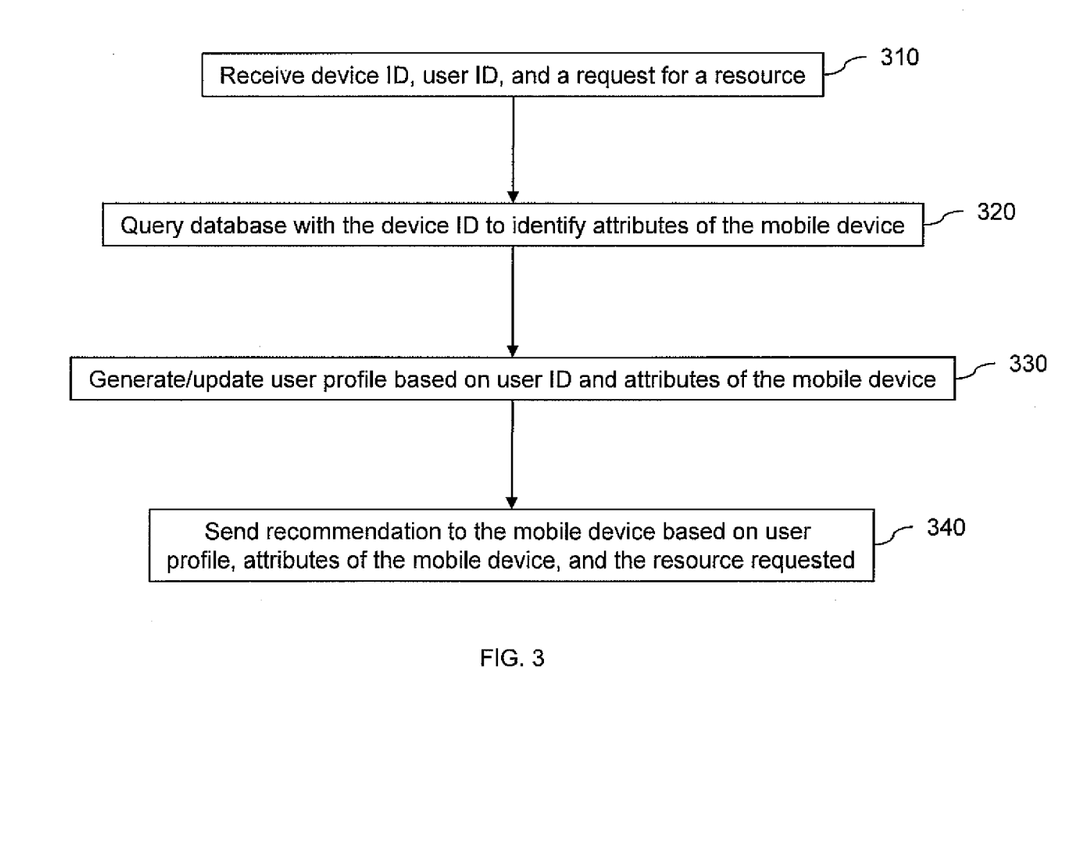
FIG. 3 is a flow diagram illustrating a method for gathering device attributes from multiple devices according to an embodiment of the invention.

FIG. 2 illustrates a system 200 for gathering device attributes from multiple devices according to another embodiment of the invention. The system 200 includes an interface 210, a database 220, and a processor 230. FIG. 3 is a flow diagram illustrating a method for gathering device attributes from multiple devices according to an embodiment of the invention, for example, using the system 200. The interface 210 receives a device identifier (also referred to herein as a "user-agent identifier"), a user identifier (e.g., name, e-mail address, phone number, and/or a combination thereof), and a request for a resource (e.g., web application, access to a website) from a mobile device 310. For example, when an individual named John Doe uses his mobile device to access the webpage http://www.uspto.gov, the interface 210 receives: John Doe, DEF839001, and http://www.uspto.gov. As used herein, the term "mobile" means capable of operating while not physically attached to a fixed object via a power cord or wired internet connection. In at least one embodiment, the device identifier, user identifier, and request are received through a service provider (also referred to herein as a "website").

The interface 210 is connected to the database 220, wherein the database 220 includes attributes of mobile devices (e.g., manufacturer, model, type, capabilities). As used herein, the term "connected" includes operationally connected, logically connected, in communication with, physically connected, engaged, coupled, contacts, linked, affixed, and attached. In at least one embodiment, the system 200 lacks the database 220, wherein the system 200 is connected to an external database or other electronic storage device.

The database 220 is queried with the device identifier to identify attributes of the mobile device 320. For example, a query of the database 220 with the device identifier DEF839001 includes the following results: BlackBerry® Curve™ 9330, Wi-Fi 802.11b/g network, Bluetooth® compatible, BlackBerry® operating system, color display, 512 MB built-in memory, microSD card slot, 2.0 MP digital camera, MP3 player, and QWERTY keyboard.

A user profile is generated (or updated) based on the received user identifier and the identified attributes of the mobile device 330. In at least one embodiment, user profiles are stored in the database 220. The user profiles include user identifiers and lists, wherein each of the lists include one or more mobile devices used by each user to access resources. For example, the user profile for John Doe includes: John Doe, 703-555-0000, BlackBerry® Curve™ 9330, Apple® iPad® 2, and Dell® Inspiron® Laptop i15R-789MRB. In at least one embodiment, the common and/or complementary attributes between at least two mobile devices in the profile of the user are identified. In another embodiment, the profiles of users are analyzed to determine the mobile device types (e.g., BlackBerry® mobile telephone, iPad® computer tablet) used by the users to access the resource.

The processor 230 is connected to the database 220, wherein the processor 230 generates a recommendation based on the profile of the user, the attributes of the mobile device, and the resource requested 340. The recommendation includes a recommended mobile device and/or a recommended combination of mobile devices, i.e., two or more mobile devices that work together to operate/run/process the resource requested. For example, based on the profile of the user, the attributes of the mobile device, and the resource requested, the processor 230 recommends XYZ mobile device, which includes a color display, a video player, and a large memory capacity. In at least one embodiment, the recommended mobile device and/or recommended combination of mobile devices are in the list in the user's profile.

In at least one embodiment of the invention, the request for the resource is sent from the mobile device to a service provider/website, and sent from the service provider/website to a back end web service. For example, as illustrated in FIG. 1, a request is sent from a mobile device to W1, and sent from W1 to the system 100. The receiving of the device identifier, the querying of the database, and the generating or updating of the user profile is performed by the back end web service.

In at least one embodiment of the invention, the processor 230 instructs the interface 210 to automatically (i.e., without user input, other than the initial request) send a link to the resource to the e-mail address of the user and/or a second mobile device of the user. In at least one embodiment, the link (e.g., URL) is automatically sent when the resource is incompatible with the mobile device, i.e., the mobile device is not capable of rendering/consuming/playing the resource.

In another embodiment, the processor 230 transcodes the resource from a first format to a second format different from the first format, wherein the second format is compatible with the mobile device and/or a second mobile device of the user. Resource transcoding can be performed automatically by making back-end calls to media and document conversion services. The media conversion services can include audio convertors, video convertors, image convertors, etc. The document conversion services can include document file format convertors such as pdf-to-html, doc-to-txt, doc-to-pdf, etc.

In yet another embodiment, the resource is customized based on the identified attributes of the mobile device. For example, when converting from pdf-to-html, the html is created such that it fits the view port of the user's mobile device based on device-width. Further, the html can be customized to have scripts for efficient viewing in both horizontal and vertical orientations based on a user's device attribute indicating dual orientation capability. When images are converted from one format to another (e.g., .png-to-.jpg), the new image can be customized by scaling down the new image based on the width of the mobile device of the user (while keeping the aspect ratio intact). When audio files are converted from one format to another (e.g., mp3-to-midi) the new audio file can be customized to have polyphonic or monophonic data based on the user's device attributes. The requested resource (media/document) is thus customized for the user depending on the type of devices (and attributes of the devices) listed in his or her profile.

The process software (e.g., IBM WebSphere® Process Server software, IBM Business Process Manager) is shared, simultaneously serving multiple customers in a flexible, automated fashion. It is standardized, requiring little customization and it is scalable, providing capacity on demand in a pay-as-you-go model.

The process software can be stored on a shared file system accessible from one or more servers. The process software is executed via transactions that contain data and server processing requests that use CPU units on the accessed server. CPU units are units of time such as minutes, seconds, hours on the central processor of the server. Additionally the accessed server may make requests of other servers that require CPU units. CPU units are an example that represents but one measurement of use. Other measurements of use include but are not limited to network bandwidth, memory usage, storage usage, packet transfers, complete transactions etc.

When multiple customers use the same process software application, their transactions are differentiated by the parameters included in the transactions that identify the unique customer and the type of service for that customer. All of the CPU units and other measurements of use that are used for the services for each customer are recorded. When the number of transactions to any one server reaches a number that begins to affect the performance of that server, other servers are accessed to increase the capacity and to share the workload. Likewise when other measurements f use such as network bandwidth, memory usage, storage usage, etc. approach a capacity so as to affect performance, additional network bandwidth, memory usage, storage etc. are added to share the workload.

The measurements of use used for each service and customer are sent to a collecting server that sums the measurements of use for each customer for each service that was processed anywhere in the network of servers that provide the shared execution of the process software. The summed measurements of use units are periodically multiplied by unit costs and the resulting total process software application service costs are alternatively sent to the customer and or indicated on a web site accessed by the customer which then remits payment to the service provider.

In another embodiment, the service provider requests payment directly from a customer account at a banking or financial institution.

In another embodiment, if the service provider is also a customer of the customer that uses the process software application, the payment owed to the service provider is reconciled to the payment owed by the service provider to minimize the transfer of payments.

Figure 4:
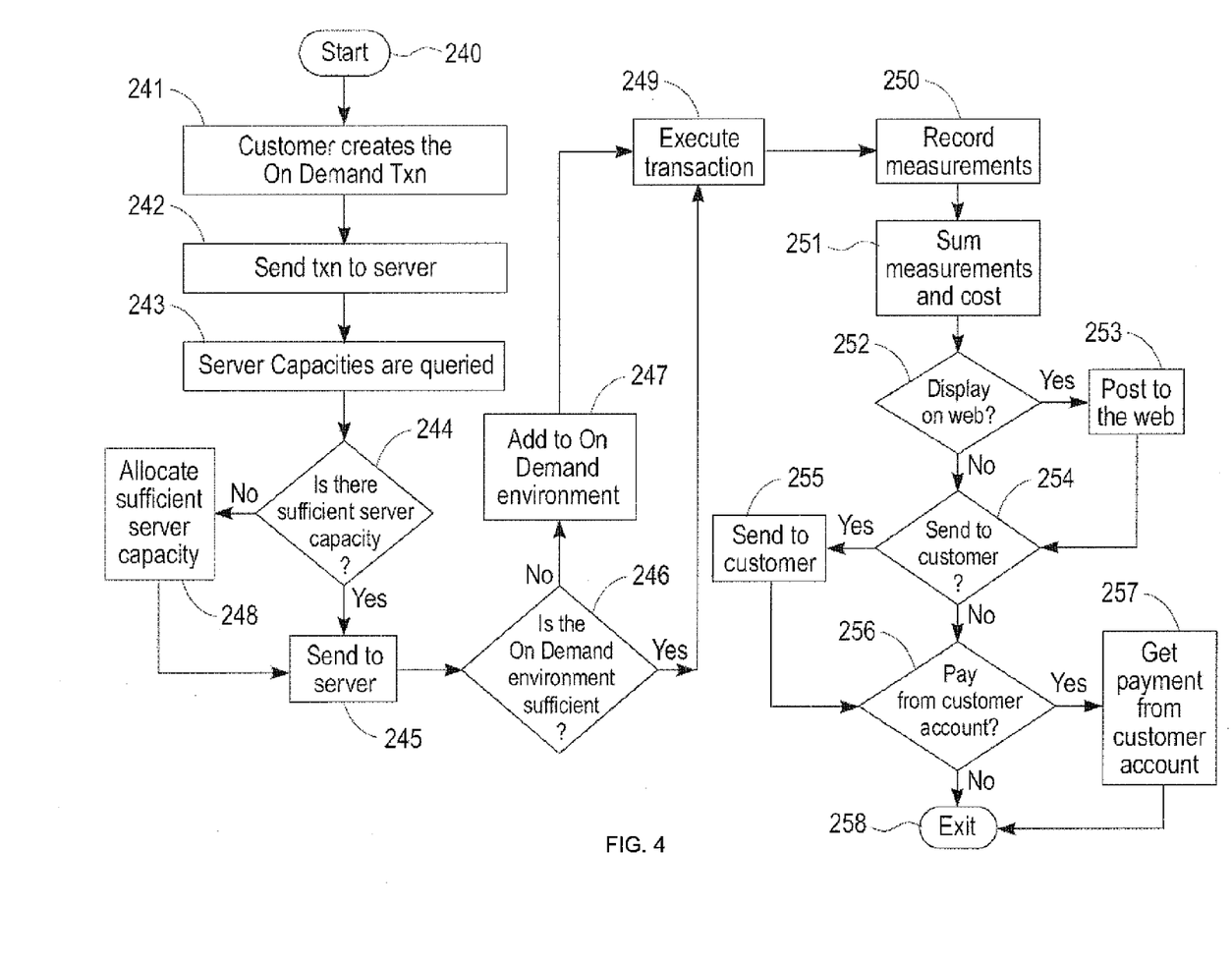
FIG. 4 illustrates a system and method for On Demand according to an embodiment of the invention.

Step 240 begins the On Demand process. A transaction is created than contains the unique customer identification, the requested service type and any service parameters that further specify the type of service 241. The transaction is then sent to the main server 242. In an On Demand environment the main server can initially be the only server, and then as capacity is consumed other servers are added to the On Demand environment.

The server central processing unit (CPU) capacities in the On Demand environment are queried 243. The CPU requirement of the transaction is estimated, then the server's available CPU capacity in the On Demand environment is compared to the transaction CPU requirement to see if there is sufficient CPU available capacity in any server to process the transaction 244. If there is not sufficient server CPU available capacity, then additional server CPU capacity is allocated to process the transaction 248. If there was already sufficient Available CPU capacity then the transaction is sent to a selected server 245.

Before executing the transaction, a check is made of the remaining On Demand environment to determine if the environment has sufficient available capacity for processing the transaction. This environment capacity consists of such things as but not limited to network bandwidth, processor memory, storage etc. 246. If there is not sufficient available capacity, then capacity will be added to the On Demand environment 247. Next the required software to process the transaction is accessed, loaded into memory, and then the transaction is executed 249.

The usage measurements are recorded 250. The usage measurements consist of the portions of those functions in the On Demand environment that are used to process the transaction. The usage of such functions as, but not limited to, network bandwidth, processor memory, storage and CPU cycles are what is recorded. The usage measurements are summed, multiplied by unit costs and then recorded as a charge to the requesting customer 251.

If the customer has requested that the On Demand costs be posted to a web site 252 then they are posted 253. If the customer has requested that the On Demand costs be sent via e-mail to a customer address 254 then they are sent 255. If the customer has requested that the On Demand costs be paid directly from a customer account 256 then payment is received directly from the customer account 257. The last step is exit the On Demand process.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in at least one computer readable medium having computer readable program code embodied thereon.

Any combination of at least one computer readable medium may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having at least one wire, portable computer diskette, hard disk, random access memory (RAM), read-only memory (ROM), erasable programmable read-only memory (EPROM or Flash memory), optical fiber, portable compact disc read-only memory (CD-ROM), optical storage device, magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of at least one programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute with the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 5:
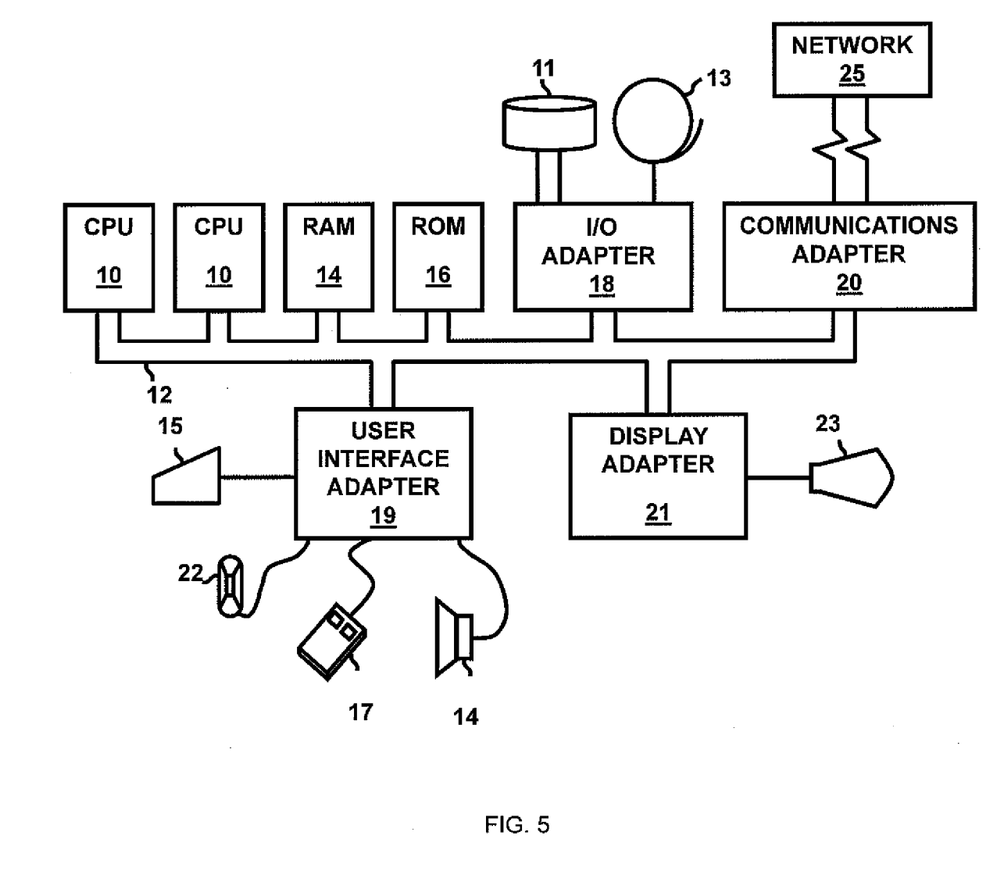
FIG. 5 illustrates a computer program product according to an embodiment of the invention.

Referring now to FIG. 5, a representative hardware environment for practicing at least one embodiment of the invention is depicted. This schematic drawing illustrates a hardware configuration of an information handling/computer system in accordance with at least one embodiment of the invention. The system comprises at least one processor or central processing unit (CPU) 10. The CPUs 10 are interconnected with system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of at least one embodiment of the invention. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the root terms "include" and/or "have", when used in this specification, specify the presence of stated features, integers, steps, operations, elements, and/or components, but do not preclude the presence or addition of at least one other feature, integer, step, operation, element, component, and/or groups thereof.

The corresponding structures, materials, acts, and equivalents of all means plus function elements in the claims below are intended to include any structure, or material, for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
    receiving a device identifier, a user identifier, and a request for a resource from a mobile device;
    querying a database with the device identifier to identify attributes of the mobile device;
    one of generating and updating a profile of a user based on the user identifier and the identified attributes of the mobile device, the profile of the user comprising a list including at least one mobile device used by the user to access resources;
    sending a recommendation to the mobile device based on the profile of the user, the attributes of the mobile device, and the resource requested, the recommendation including at least one of a recommended mobile device and a recommended combination of mobile devices.

2. The method according to claim 1, wherein at least one of the recommended mobile device and the recommended combination of mobile devices are in the list in the profile of the user.

3. The method according to claim 1, further comprising automatically sending a link to the resource to at least one of an e-mail address of the user and a second mobile device of the user.

4. The method according to claim 3, wherein said automatically sending of the link is performed when the resource is incompatible with the mobile device.

5. The method according to claim 1, further comprising transcoding the resource from a first format to a second format, the second format being compatible with at least one of the mobile device and a second mobile device of the user.

6. The method according to claim 1, further comprising analyzing profiles of users to determine mobile device types used by the users to access the resource.

7. The method according to claim 1, wherein the request for the resource is sent from the mobile device to a service provider, and sent from the service provider to a back end web service, and
    said receiving of the device identifier, said querying of the database, and said one of generating and updating the profile of the user is performed by the back end web service.

8. The method according to claim 1, further comprising identifying at least one of:
    common attributes between at least two mobile devices in the profile of the user; and
    complementary attributes between at least two mobile devices in the profile of the user.

9. The method according to claim 1, further comprising customizing the resource based on the identified attributes of the mobile device.

10. The method according to claim 1, wherein the attributes of the mobile device include at least one of a manufacturer, a model, a type, and capabilities of the mobile device.

11. A method comprising:
    receiving a device identifier, a user identifier, and a request for a resource from a mobile device;
    querying a database with the device identifier to identify attributes of the mobile device;
    one of generating and updating a profile of a user based on the user identifier and the identified attributes of the mobile device, the profile of the user comprising a list including at least one mobile device used by the user to access resources;
    sending the resource and a recommendation to the mobile device based on the profile of the user, the attributes of the mobile device, and the resource requested, the recommendation including at least one of a recommended mobile device and a recommended combination of mobile devices.

12. The method according to claim 11, further comprising transcoding the resource from a first format to a second format, the second format being compatible with at least one of the mobile device and a second mobile device of the user.

13. The method according to claim 11, further comprising analyzing profiles of users to determine mobile device types used by the users to access the resource.

14. The method according to claim 11, wherein the request for the resource is sent from the mobile device to a service provider, and sent from the service provider to a back end web service, and
    said receiving of the device identifier, said querying of the database, and said one of generating and updating the profile of the user is performed by the back end web service.

15. The method according to claim 11, further comprising identifying at least one of:
    common attributes between at least two mobile devices in the profile of the user; and
    complementary attributes between at least two mobile devices in the profile of the user.

16. The method according to claim 11, further comprising customizing the resource based on the identified attributes of the mobile device.

17. A system comprising:
    an interface for receiving a device identifier, a user identifier, and a request for a resource from a user of a mobile device;
    a database connected to said interface, said database includes:
        attributes of mobile devices, and user profiles including user identifiers and lists, each of the lists including at least one mobile device used by each user to access resources; and a processor connected to said database, said processor recommends at least one of a recommended mobile device and a recommended combination of mobile devices based on a profile of the user, attributes of the mobile device, and the resource requested.

18. The system according to claim 17, wherein said interface automatically sends a link to the resource to at least one of an e-mail address of the user and a second mobile device of the user.

19. The system according to claim 17, wherein said processor transcodes the resource from a first format to a second format, the second format being compatible with at least one of the mobile device and a second mobile device of the user.

20. The system according to claim 17, wherein said interface is in communication with a service provider/website, wherein the request for the resource is sent from the mobile device to the service provider/website, and sent from the service provider to said interface.

21. The system according to claim 17, wherein said processor identifies at least one of:
   common attributes between at least two mobile devices in the profile of the user; and
   complementary attributes between at least two mobile devices in the profile of the user.

22. A computer program product comprising:
   a computer readable storage medium;
   first program instructions to receive a device identifier, a user identifier, and a request for a resource from a mobile device;
   second program instructions to query a database with the device identifier to identify attributes of the mobile device;
   third program instructions to one of generate and update a profile of a user based on the user identifier and the identified attributes of the mobile device, the profile of the user comprising a list including at least one mobile device used by the user to access resources;
   fourth program instructions to send a recommendation to the mobile device based on the profile of the user, the attributes of the mobile device, and the resource requested, the recommendation including at least one of a recommended mobile device and a recommended combination of mobile devices,
   said first program instructions, said second program instructions, said third program instructions, and said fourth program instructions are stored on said computer readable storage medium.

23. The computer program product according to claim 22, further comprising fifth program instructions to automatically send a link to the resource to at least one of an e-mail address of the user and a second mobile device of the user.

24. The computer program product according to claim 22, further comprising sixth program instructions to transcode the resource from a first format to a second format, the second format being compatible with at least one of the mobile device and a second mobile device of the user.

25. The method according to claim 11, further comprising automatically sending a link to the resource to at least one of an e-mail address of the user and a second mobile device of the user.

* * * * *